(12) United States Patent
Ulber et al.

(10) Patent No.: US 11,351,517 B2
(45) Date of Patent: Jun. 7, 2022

(54) REFORMER TUBE HAVING A STRUCTURED CATALYST AND IMPROVED HEAT BALANCE

(71) Applicant: L'Air Liquide, Societe Anonyme pour l'Etude et l'Exploitation des Procedes Georges Claude, Paris (FR)

(72) Inventors: Dieter Ulber, Steinbach (DE); Daniel Gary, Montigny Bretonneux (FR); Laurent Prost, Gif-sur-Yvette (FR); Jean-Philippe Tadiello, Frankfurt am Main (DE); Marie Basin, Versailles (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 235 days.

(21) Appl. No.: 16/333,004

(22) PCT Filed: Sep. 5, 2017

(86) PCT No.: PCT/EP2017/025252
§ 371 (c)(1),
(2) Date: Mar. 13, 2019

(87) PCT Pub. No.: WO2018/050291
PCT Pub. Date: Mar. 22, 2018

(65) Prior Publication Data
US 2019/0275494 A1  Sep. 12, 2019

(30) Foreign Application Priority Data

Sep. 14, 2016  (EP) .................................... 16400041

(51) Int. Cl.
*B01J 19/24* (2006.01)
*B01J 19/32* (2006.01)
(Continued)

(52) U.S. Cl.
CPC ............. *B01J 19/246* (2013.01); *B01J 8/062* (2013.01); *B01J 19/32* (2013.01); *B01J 19/325* (2013.01);
(Continued)

(58) Field of Classification Search
None
See application file for complete search history.

(56) References Cited

U.S. PATENT DOCUMENTS 3,215,502 A * 11/1965 Korwin ..................... C10G 9/20
422/629
3,607,125 A * 9/1971 Kydd ....................... B01J 8/062
422/625
(Continued)

FOREIGN PATENT DOCUMENTS

| CN | 2 098 965 | 3/1992 |
| CN | 207102559 | * 3/2018 |

(Continued)

OTHER PUBLICATIONS

International Search Report and Written Opinion for PCT/EP2017/025252, dated Nov. 8, 2017.
(Continued)

*Primary Examiner* — Kaity V Chandler
(74) *Attorney, Agent, or Firm* — Justin K. Murray (57) ABSTRACT

A reformer tube for producing synthesis gas by steam reforming of hydrocarbon-containing feed gases, in which a structured stream reforming catalyst is used, is proposed. According to the invention, a heat exchanger tube is arranged in the interior of the structured catalyst, with the feed gas stream flowing firstly through the structured catalyst and subsequently in countercurrent through the heat exchanger tube. This improves the heat exchange between the synthesis gas product stream and the structured catalyst (Continued)

and the feed gas stream flowing through it, especially in the radial direction.

14 Claims, 5 Drawing Sheets

(51) Int. Cl.
*B01J 8/06* (2006.01)
*C01B 3/38* (2006.01)

(52) U.S. Cl.
CPC ......... *C01B 3/384* (2013.01); *B01J 19/2415* (2013.01); *B01J 2208/0053* (2013.01); *B01J 2208/00495* (2013.01); *B01J 2208/00504* (2013.01); *B01J 2208/027* (2013.01); *B01J 2208/065* (2013.01); *B01J 2219/00155* (2013.01); *B01J 2219/00157* (2013.01); *B01J 2219/00159* (2013.01); *B01J 2219/3221* (2013.01); *B01J 2219/32231* (2013.01); *B01J 2219/32272* (2013.01); *B01J 2219/32466* (2013.01); *C01B 2203/0233* (2013.01); *C01B 2203/0816* (2013.01); *C01B 2203/1017* (2013.01); *C01B 2203/1023* (2013.01); *C01B 2203/1029* (2013.01); *C01B 2203/1058* (2013.01)

(56) References Cited

U.S. PATENT DOCUMENTS

| | | | | |
|---|---|---|---|---|
| 4,340,501 A | * | 7/1982 | Davidson | B01J 12/007 252/373 |
| 4,985,231 A | * | 1/1991 | Lywood | B01J 8/062 423/652 |
| 5,264,008 A | * | 11/1993 | Corrigan | B01J 8/062 48/94 |
| 5,275,632 A | * | 1/1994 | Corrigan | B01J 8/062 48/94 |
| 6,077,459 A | * | 6/2000 | Laursen | C01B 3/382 252/376 |
| 6,402,988 B1 | | 6/2002 | Gottzmann et al. | |
| 2012/0195801 A1 | | 8/2012 | Whittenberger et al. | |
| 2013/0274508 A1 | * | 10/2013 | DeCourcy | B01J 15/005 562/534 |
| 2016/0347613 A1 | * | 12/2016 | Chlapik | B01J 8/062 |
| 2019/0275494 A1 | | 9/2019 | Ulber et al. | |

FOREIGN PATENT DOCUMENTS

| | | | | |
|---|---|---|---|---|
| CN | 207102559 U | * | 3/2018 | |
| CN | 207 709 023 | | 8/2018 | |
| EP | 0 025 308 | | 3/1981 | |
| EP | 1 857 174 | | 11/2007 | |
| EP | 1 944 269 | | 7/2008 | |
| FR | 2531944 A1 | * | 2/1984 | ............. B01J 8/062 |
| JP | H11169702 A | * | 12/1997 | ............. B01J 8/062 |
| WO | WO 00/27518 | | 5/2000 | |
| WO | WO 01/12310 | | 2/2001 | |
| WO | WO-2009057908 A2 | * | 5/2009 | ............. B01J 8/062 |
| WO | WO 2013/068416 | | 5/2013 | |
| WO | WO 2015/132555 | | 9/2015 | |

OTHER PUBLICATIONS

Higman, Christopher, "Synthesis Gas Process for Synfuels Production," http://www.higman.de/gasification/papers/eurogas.pdf, Eurogas-90 Conference, Trondheim, Jun. 1990.

Grunewald M., et al., "Strukturierte Katalysatoren als Bausteine Multifunktionaler Reaktoren," Chemie Ingenieur Technik 2007, 79, No. 9, 1290-1291 (Machine Translation).

Aguero A., et al., "Metal Dusting Protective Coatings. A Literature Review," Oxid Met (2011), 76, 23-42.

* cited by examiner

REFORMER TUBE HAVING A STRUCTURED CATALYST AND IMPROVED HEAT BALANCE

CROSS REFERENCE TO RELATED APPLICATIONS

This application is a § 371 of International PCT Application PCT/EP2017/025252, filed Sep. 5, 2017, which claims the benefit of EP16400041.6, filed Sep. 14, 2016, both of which are herein incorporated by reference in their entireties.

FIELD OF THE INVENTION

The invention relates to a reformer tube for converting hydrocarbon-containing feeds, preferably natural gas and light liquid hydrocarbons such as naphtha, into a synthesis gas product containing carbon oxides and hydrogen. The reformer tube of the invention allows internal heat exchange between the feed gas and the product gas which has been partially converted into synthesis gas products, which gives advantages in respect of the energy consumption in the production of synthesis gas and the products of value hydrogen and carbon monoxide. Furthermore, the pressure drop is reduced by the use of a structured reforming catalyst.

The invention further relates to a process for producing synthesis gas by steam reforming of hydrocarbon-containing feeds using the reformer tube of the invention, and also to a reformer furnace equipped with the reformer tube.

BACKGROUND

Hydrocarbons can be catalytically reacted with steam to give synthesis gas, i.e. mixtures of hydrogen ($H_2$) and carbon monoxide (CO). As indicated in Ullmann's Encyclopedia of Industrial Chemistry, Sixth Edition, 1998 Electronic Release, keyword "Gas Production", this steam reforming is the most widely employed method for producing synthesis gas, which can subsequently be converted into further important basic chemicals such as methanol or ammonia. Although various hydrocarbons such as naphtha, liquefied petroleum gas or refinery gases can be reacted, the steam reforming of methane-containing natural gas predominates.

The steam reforming of natural gas proceeds highly endothermically. It is therefore carried out in a reformer furnace in which a large number of catalyst-containing reformer tubes in which the steam reforming reaction proceeds are arranged in parallel. The outer walls of the reformer furnace and also its top and its bottom are clad or lined with a number of layers of refractory material which withstands temperatures of up to 1200° C. The reformer tubes are usually fired by means of burners which are installed on the upper side or underside or on the side walls of the reformer furnace and directly fire the intermediate space between the reformer tubes. Here, heat transfer to the reformer tubes occurs by thermal radiation and convective heat transfer from the hot flue gases.

After preheating by means of heat exchangers or fired heaters to about 500° C., the hydrocarbon/steam mixture is finally heated to about 500-800° C. and then enters the reformer tubes and is converted there over the reforming catalyst into carbon monoxide and hydrogen. Reforming catalysts based on nickel are widespread. While higher hydrocarbons are converted completely into carbon monoxide and hydrogen, in the case of methane a partial conversion is usually obtained. The composition of the product gas is determined here by the reaction equilibrium; the product gas therefore also contains carbon dioxide, unreacted methane and water vapour in addition to carbon monoxide and hydrogen. For the purposes of energy optimization or in the case of feeds comprising higher hydrocarbons, a prereformer for preliminary dissociation of the feed can be used after the preheater. The predissociated feed is then heated to the desired reformer tube entry temperature in a further heater.

The hot synthesis gas product gas is partially cooled in one or more heat exchangers after leaving the reformer furnace. The partially cooled synthesis gas product gas subsequently goes through further conditioning steps which are dependent on the type of desired product or the downstream process.

The steam reforming of natural gas is notable for its high energy consumption. There have therefore already been proposals in the prior art which attempt to minimize the consumption of extraneous energy by optimized structuring of the process, for example by energy recovery. Thus, an HCT reformer tube having internal heat exchange has been presented by Higman at the Eurogas-90 conference, Trondheim, June 1990, also published under http://www.higman.de/gasification/papers/eurogas.pdf (retrieved on 27 Sep. 2011). This HCT reformer tube comprises an outer reformer tube which is filled with catalyst and fired from the outside and in which the feed gas flows from the top downwards through the catalyst bed. In the interior of the catalyst bed, there are two helical heat exchanger tubes which are arranged as a double helix and are made of a suitable material and through which the partially reformed gas flows after leaving the catalyst bed and in doing so releases part of its sensible heat to the steam reforming process proceeding over the catalyst. However, a disadvantage here is the higher pressure drop due to the longer distance over which the gas is conveyed through the helical heat exchanger tubes. A reformer tube which has been further developed on this basis and has internal heat exchange is also taught in the International Patent Application WO 2013/068416 A1.

In the further development of steam reforming technology, there is not only the objective of optimizing the heat balance of the reformer tube but also a further objective of minimizing the pressure drop, which owing to the reduction in the compression work required brings economic advantages.

These two themes interact since structural measures which aim to improve the heat balance in the reformer tube often increase the pressure drop over the reformer tube in an undesirable way. For this reason, if the total pressure drop over the reformer tube is to be kept constant or even reduced, a reduction in the pressure drop over the reforming catalyst present remains as significant influencing variable.

One possible way of reducing the pressure drop over the reforming catalyst is to use structured packings which contain a reforming catalyst, thus forming structured catalysts. To a person skilled in the art, a structured packing will be, as a difference from unstructured packings or beds of particles, specifically designed vessel internals as are used, for example, in absorber columns, distillation columns and fixed-bed reactors. A structured packing often consists of thin, corrugated and perforated metal plates or wire meshes. Furthermore, it is possible to produce ceramic bodies which are then referred to as honeycomb bodies or honeycombs. The design of the structured packings should maximize their specific surface area and thus ensure optimal exchange between the different phases at a minimal pressure resistance or pressure drop. In the case of a heterogeneously catalysed reaction such as steam reforming, the exchange area between the structured catalyst and the gas phase should be maximized in this way. Accordingly, a structured catalyst is considered to be a structured packing which contains a catalyst as a result of the latter being, for example, applied as coating to the surface of the structured packing or being embedded in the form of small particles in the structural elements of the structured packing.

The use of structured catalysts for the steam reforming of hydrocarbons is known per se and is described, for example, in the patent publications EP 1 857 174 A1 and EP 1 944 269 A1.

The US patent application US 2012/0195801 A1 describes the construction of structured catalysts in connection with steam reforming. Stackable packing modules or segments which are arranged around a central guide rod are taught there. The packing segments have a fan or zig-zag shape and are supported on their underside by an annular support element. The packing segments are made of metal foils and are coated with a catalytically active material, for example the nickel which is active for steam reforming. The fan shape forms flow channels which run radially and thus increases the residence time of the feed gas in the structured packing. The reactor tube is filled with packing segments by stacking individual packing segments on top of one another.

The international patent application WO 2015/132555 A1 discloses the use of structured catalysts in addition to conventional beds of particulate or pellet-like reforming catalysts in different sections of a reformer tube. That application teaches, in the case of an upright reformer tube through which feed gas flows from the top downward, arranging the reforming catalyst used as bed in the vicinity of the outlet end of the reformer tube and arranging the structured reforming catalyst in the vicinity of the inlet end of the reformer tube. In this way, complicated support constructions which are required when using structured catalysts in the vicinity of the reactor outlet will be avoided.

A disadvantage of the use of a structured catalyst for the steam reforming of hydrocarbons is the heat transfer which is sometimes poorer compared to a bed of particulate or pellet-type catalyst. Thus, the European patent application EP 1 857 174 A1 teaches that, depending on the geometry of the structured packing, the heat transfer between, in particular, the interior wall of the reformer tube and its centre, i.e. the radial heat transfer, can be poorer than in the case of a tube reactor filled with a catalyst bed. Although the radial heat transfer is improved by configuration of the packing segments as described in US 2012/0195801 A1, a reactor having further improved radial heat transfer would be desirable because of the highly endothermic nature of the steam reforming of hydrocarbons.

DESCRIPTION OF THE INVENTION

It is therefore an object of the present invention to provide a reformer tube which has advantageous properties in respect of the pressure drop combined with intensive contact between catalyst surface and feed gases and in which the internal heat exchange, in particular in the radial direction, is at the same time improved compared to the reformer tubes known from the prior art.

This object is achieved by a reformer tube having the features of embodiments described herein.
Reformer Tube According to an Embodiment of the Invention:

Reformer tube for converting hydrocarbon-containing feeds, preferably natural gas, into a synthesis gas product containing carbon oxides and hydrogen under steam reforming conditions, comprising (a) a reaction chamber comprising an outer, pressure-bearing casing tube which is heated from the outside, where the casing tube is demarcated at its one end from an adjacent outlet chamber by means of a separating plate and is closed at its other end by means of a closure device, (b) at least one structured packing which is arranged in the reaction chamber and contains a catalyst which is active for steam reforming, (c) an inlet for the feed gas stream containing the feed arranged on the reaction chamber, where the inlet is arranged at the end of the reaction chamber closest to the separating plate and is in fluid communication with the gas inlet into the structured packing, (d) a heat exchanger tube which is arranged within the reaction chamber and within the structured packing and whose inlet end is in fluid communication with the gas outlet from the structured packing and whose outlet end is in fluid communication with the outlet chamber, where the feed gas stream flows, after entry into the reaction chamber, firstly through the structured packing and subsequently in countercurrent through the heat exchanger tube and the heat exchanger tube and the synthesis gas product stream flowing through this are in a heat exchange relationship with the structured packing and the feed gas stream flowing through the latter, (e) a collection conduit for the synthesis gas product which is in fluid communication with the outlet chamber, where (f) the outlet end of the heat exchanger tube passes through the separating plate, opens into the outlet chamber and is in fluid communication with the collection conduit so that the synthesis gas product can go from the reaction chamber via the outlet chamber into the collection conduit.

The invention also provides a reformer furnace which is equipped with at least one reformer tube according to the invention, preferably a plurality of reformer tubes according to the invention, and also a process for producing synthesis gas by catalytic steam reforming of hydrocarbon-containing feeds in the reformer tube of the invention.

For the purposes of the present invention, fluid communication between two regions of the reformer tube means any type of connection which makes it possible for a fluid, for example the feed gas stream or the synthesis gas product stream, to flow from one to the other of the two regions, regardless of any regions or components located in between.

Heat exchange relationship means the possibility of heat exchange or heat transfer between two regions of the reformer tube, with all mechanisms of heat exchange or heat transfer, e.g. heat conduction, heat radiation or convective heat transport, being able to be involved.

For the purposes of the present invention, steam reforming conditions are the process conditions, in particular temperature, pressure and residence time, which are known per se to a person skilled in the art and have been mentioned above by way of example and set forth in detail in the relevant literature and under which at least a partial conversion, but preferably industrially relevant conversions, of the starting materials into synthesis gas products such as CO and hydrogen occur(s). Accordingly, a catalyst which is active for steam reforming is a catalyst which brings about such conversions under steam reforming conditions.

The terms "structured packing" and "structured catalyst" are well known to a person skilled in the art and are used in the literature. On this subject, reference may be made by way of example to the article by M. Grünewald and U. Kunz, "Strukturierte Katalysatoren als Bausteine multifunktionaler Reaktoren", Chemie Ingenieur Technik 2007, 79, No. 9.

The invention is based on the recognition that the poorer heat transfer when using a structured catalyst for the steam reforming of hydrocarbons compared to a catalyst bed can be countered by providing a heat exchanger tube in the interior of the structured catalyst, through which tube the synthesis gas product produced flows to the outlet chamber and in so doing releases part of its sensible heat in countercurrent to the structured catalyst and the feed gas stream flowing through it and thus to the steam reforming process proceeding over the catalyst. This improves, in particular, the radial heat transport in the reformer tube. A particular advantage is that the heat exchanger tube at the same time performs support and bearing functions for the structured catalyst or for the individual packing segments.

Preferred Embodiments of the Invention

In a preferred embodiment of the reformer tube of the invention, the casing tube and the heat exchanger tube each have a circular cross section, while the structured packing has an annular cross section. Here, the casing tube, the structured packing and the heat exchanger tube are arranged coaxially and concentrically, with the structured packing being arranged between the inner wall of the casing tube and the outer wall of the heat exchanger tube so as to form an essentially gastight closure so that short circuit flows along the inner wall of the casing tube and thus past the structured packing are minimized.

In a particularly preferred process configuration, the reformer tube is arranged upright, with the reaction chamber being arranged in the upper region and the outlet chamber being arranged in the lower region and the feed gas stream flowing from the bottom upwards through the structured packing. This has the advantage that both the inlet for the feed gas stream and also the collection conduit are located on the underside of the plant, underneath the reformer furnace, and are thus readily accessible for installation and inspection work. Furthermore, the construction height of the plant is reduced compared to an arrangement as is described, for example, in WO 2015/132555 A1 in which the gas inlet and gas outlet or collection conduit are located on different sides of the reformer. Flow of the feed gas stream through the reformer tube from the bottom upwards advantageously works together with the fact that the catalyst is present in structured form, since in the case of a catalyst present as particle bed there is a risk of undesirable fluidization in the case of this flow direction. In this case, catalyst particles are lifted by the gas flow and can break up on falling back. This leads to catalyst losses and also, due to the fragments or fines formed, to an undesirable increase in the pressure drop over the reformer tube.

In the reformer tube of the invention, both the structured packing and also the heat exchanger tube preferably consist of individual modules or segments, with each heat exchanger tube segment being equipped with a support or bearer device for the associated packing segment. The individual packing segments and heat exchanger tube segments can in this way be manufactured more easily before installation in the reformer tube. Various packing heights can be achieved in a simple manner by a different number of layers of packing segments, supported by corresponding heat exchanger tube segments, being stacked on top of one another. Possible support or bearer devices are, depending on the weight of the packing segments, perforated plates or wire meshes, for example, which may optionally additionally be held down by the struts extending radially from the heat exchanger tube segment. If the support or bearer devices and the struts are made of a metal or another material having good thermal conductivity, radial heat transfer in the reformer tube is additionally assisted.

In a particular embodiment of the reformer tube of the invention, the reaction chamber comprises at least one region which contains a bed of a particulate, solid catalyst which is active for steam reforming. Such reforming catalysts, which contain, for example, nickel and/or a noble metal, are commercially available. The use of a catalyst bed in a subregion of the reaction chamber of the reformer tube gives cost advantages since particulate or pellet-like reforming catalysts are cheaper to produce than structured catalysts. If such a region containing a catalyst bed is installed upstream of the structured catalyst, further advantages are obtained since this region simultaneously acts as mixing zone for the feed gas stream. The structured catalyst arranged downstream is thus supplied with a feed gas mixture which is mixed better, especially in the radial direction. The support or bearer device of the first packing segment downstream of the catalyst bed at the same time prevents fluidization of the catalyst bed. However, arrangement of a region containing a catalyst bed downstream of the structured catalyst can also be advantageous. It would in this case be possible to use, for example, a more active, noble metal-containing catalyst which increases the total conversion of the feed gas mixture into synthesis gas products.

A free space in the reaction chamber which can accommodate the region containing the catalyst bed can preferably be formed by the corresponding packing segment being left out but the associated heat exchanger tube segment being present. The support or bearer devices of the omitted and subsequent packing segment which are present on the upper side and underside of this region can then serve as retention devices for the catalyst bed. If the region containing the catalyst bed is to be arranged on the inlet side, i.e. upstream of the structured catalyst, an additional retention device, for example a perforated plate, for this catalyst bed can optionally be provided.

In an advantageous embodiment of the reformer tube of the invention, the heat exchanger tube is at least partly filled with a bed of inert bodies or is provided on its inside with guide plates. Depending on the internal diameter of the heat exchanger tube, the heat transfer from the synthesis gas product stream to the interior wall of the tube and the heat conduction through this wall can be effectively increased in this way. Depending on the pressure drop requirements, either a bed of inert bodies (relatively high pressure drop) or guide plates (relatively low pressure drop) can be used.

In connection with the configuration and selection of material for the reformer tube of the invention and its constituents, it has to be taken into account that, especially in the case of reformer tubes having internal heat exchange, a corrosion referred to as "metal dusting" can become more pronounced since relatively long sections of the heat exchanger tubes are sometimes subjected to the temperature range relevant for metal dusting corrosion.

As taught in the specialist article "Metal Dusting Protective Coatings. A Literature Review", A. Agüero et al., Oxid Met (2011) 76:23-42, metal dusting is a type of corrosive disintegration of metals and alloys into fine particles. Materials which are susceptible to this type of corrosive attack are, in particular, iron, nickel, cobalt and alloys thereof. Metal dusting occurs at high temperatures of from about 400 to 800° C. and in gas atmospheres which contain, in particular, carbon monoxide (CO) or hydrocarbons. At high temperatures, CO and hydrocarbons tend to dissociate over metal and in this way deposit carbon on the metal surface. The carbon is then transferred to the solid phase and extracts the susceptible metals from their homogeneous solid matrix, as a result of which pit corrosion and finally mechanical collapse of the materials occurs. This leads to high maintenance costs and can cause serious safety problems, for example as a result of rupture of pressurized conduits and apparatuses and/or escape of toxic carbon monoxide.

Metal dusting corrosion is frequently observed in steam reforming processes in which all plant parts, in particular equipment parts of the waste heat section, which come into contact with the synthesis gas produced in the abovementioned temperature range are affected.

The occurrence of metal dusting can, for example, be prevented or at least slowed by application of a corrosion-inhibiting coating to the alloy surface. Here, use is frequently made of diffusion coatings which are formed when an alloy is coated with a metal or a metal mixture at a temperature which is high enough to make diffusion of the metal(s) into the substrate possible. This gives a metallurgical bond with the substrate material and the coating then becomes an integral constituent of the substrate material. Making complete plant parts, for example pipes, of ceramic materials also offers protection against metal dusting corrosion.

A preferred embodiment of the reformer tube of the invention is accordingly obtained by providing the outlet end of the heat exchanger tube with a corrosion protection layer on its inside and providing the proportion which has been passed through the separating plate with a corrosion protection layer also on its outside. This corrosion protection layer can, for example, be formed by an aluminium diffusion layer. In addition or as an alternative, a corrosion-resistant material, for example a nickel-based alloy, should be used for the heat exchanger tube.

In a further embodiment of the invention, the outlet chamber is also to be made resistant to metal dusting corrosion. This can be achieved by the outlet end of the heat exchanger tube which has been passed through the separating plate opening into an inner tube which is arranged in the interior of the casing tube and is in fluid communication with the collection conduit, so that the synthesis gas product can go from the reaction chamber via the outlet chamber into the collection conduit, with the inner tube being provided with a corrosion protection layer or consisting of a corrosion-resistant material, e.g. a ceramic material. Here, it is not necessary for the end of the heat exchanger tube to be introduced into the inner tube. Rather, heat exchanger tube and inner tube can also be arranged with a small distance between them. It is important that the gas flow exiting from the heat exchanger tube flows essentially completely into the inner tube and thus opens into the latter.

In a further aspect, the invention provides a reformer furnace comprising a lid, a bottom and walls clad or lined with refractory material and an interior space formed thereby which is characterized in that at least one reformer tube according to the invention and at least one burner for heating the reformer tube are arranged in the interior space or in a secondary space which is in fluid communication with the interior space in respect of the burner flue gases.

In a preferred embodiment, at least one reformer tube is arranged upright in the interior space of the reformer furnace of the invention, where the part of the reformer tube encompassing the reaction chamber is arranged at least partly in the interior space and the part of the reformer tube encompassing the outlet chamber is arranged at least partly outside the interior space. This has the advantage that both the inlet for the feed gas stream and the collection conduit are located on the underside of the plant, beneath the reformer furnace, and are thus readily accessible for installation and inspection work. Furthermore, the construction height of the plant is reduced compared to an arrangement as described, for example, in WO 2015/132555 A1, in which gas inlet and gas outlet or collection conduit are located on different sides of the reformer.

In a further preferred embodiment of the reformer furnace of the invention, the inlet for the feed gas stream comprising the feed is also arranged outside the interior space. An advantage here is that the inlet can be made of a less heat-resistant material and is more readily accessible for inspections.

In a particular embodiment of the reformer furnace of the invention, the at least one reformer tube is arranged in a freely suspended or freestanding manner in the interior space, where the part of the casing tube encompassing the reaction chamber is arranged in the interior space and the part of the casing tube encompassing the outlet chamber is passed at least partly through the lid or the bottom. In this context, freely suspended or freestanding means that only the end of the reformer tube encompassing the outlet chamber is in mechanical contact with the lid or the bottom of the reformer furnace.

This is particularly advantageous since in this way thermomechanical stresses between the inlet for the feed gas stream and the outlet for the synthesis gas product stream, which arise because of the considerable temperature differences in the reformer tubes known from the prior art in which in each case the inlet end and the outlet end project from the reformer furnace, are avoided. In the reformer tubes, complicated measures such as the use of counterweight systems, stress compensators (known as pigtails) or of tensioning cables are therefore used to compensate for the stresses occurring and their adverse effects, for example deformation of the reformer tube. This is no longer necessary in the case of the freely suspended or freestanding arrangement of the reformer tube.

As an alternative to the last embodiment of the reformer furnace of the invention put forth above, an upright or suspended arrangement of the at least one reformer tube in the interior space, in which the closure device or the part of the casing tube adjacent thereto is connected to a counterweight system in order to prevent deformation of the reformer tube which can be caused by longitudinal thermal expansion of the tube, can also come into consideration.

In a further preferred embodiment of the reformer furnace of the invention, a plurality of reformer tubes and burners are arranged in the interior space in such a way that the longitudinal axes of the flames produced by the burners are directed parallel to the longitudinal axes of the reformer tubes. In this way, it can be ensured that a burner uniformly heats the reformer tube arranged around it. Furthermore, radiative heat is supplied to the reformer tubes over a longer distance by the parallel flame axes and local overheating of the outsides of the reformer tubes is avoided.

In a further aspect, the invention provides a process for producing synthesis gas by catalytic steam reforming of hydrocarbon-containing feeds, preferably natural gas, under steam reforming conditions in the presence of a solid catalyst which is active for steam reforming, comprising the following steps:

(a) provision of a feed gas stream containing the feed and addition of reforming steam, (b) catalytic conversion of the feed under steam reforming conditions into a synthesis gas product containing carbon oxides and hydrogen,
(c) discharge and optionally work-up of the synthesis gas product,
characterized in that the catalytic conversion in step (b) is carried out in a reformer tube according to the invention in one of the embodiments indicated.

BRIEF DESCRIPTION OF THE DRAWINGS

Further developments, advantages and possible uses of the invention can also be derived from the following description of examples and of the drawing. All features described and/or pictured, either in themselves or in any combination, form the invention, regardless of the way in which they are summarized in the claims or the associated back-references.

The figures show.

DETAILED DESCRIPTION OF THE INVENTION

Figure 1:
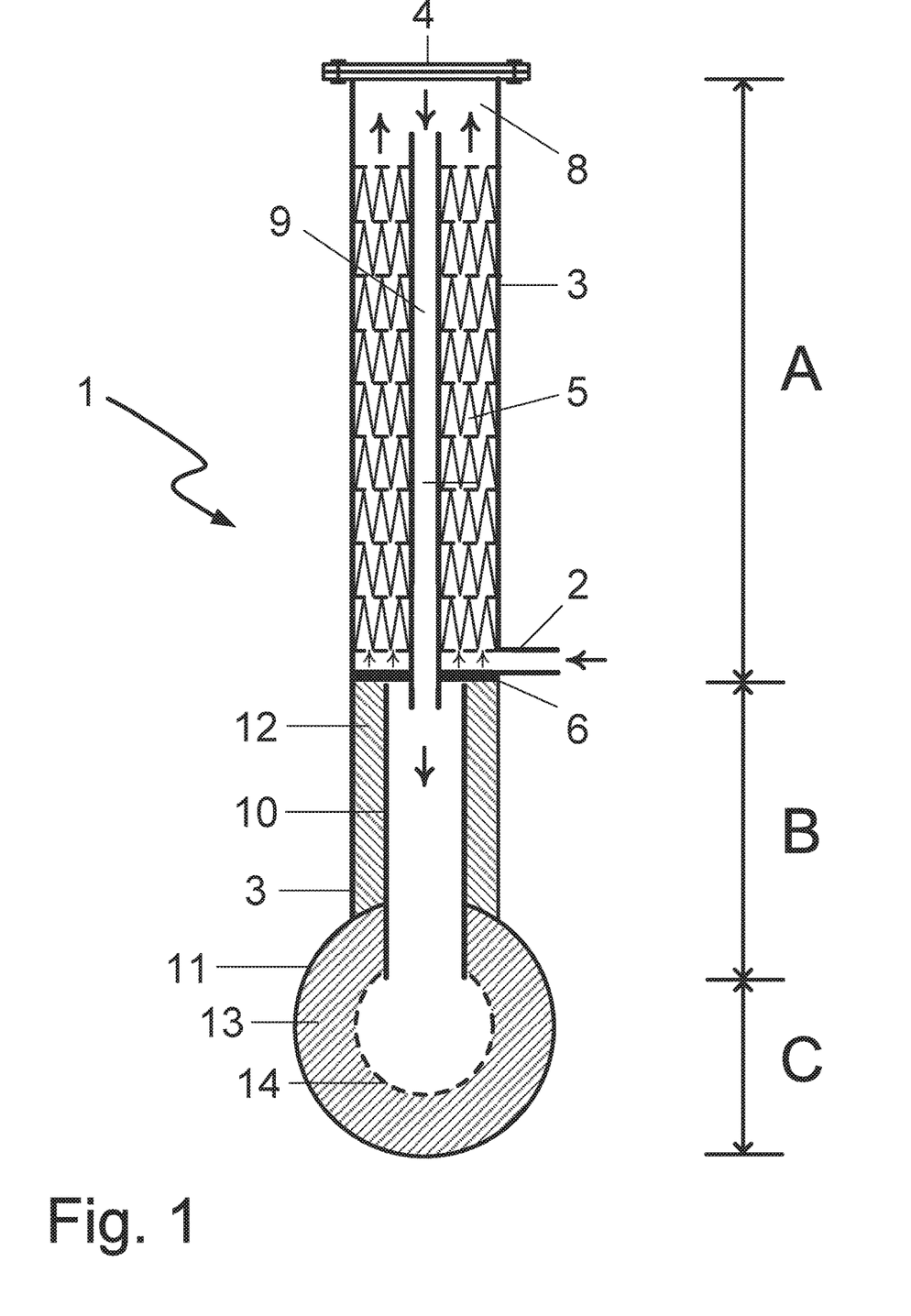
FIG. 1 a reformer tube as per a first embodiment of the invention,
FIG. 2 a reformer tube as per a second embodiment of the invention,
FIG. 3 a reformer tube as per a third embodiment of the invention,
FIG. 4 the structure of a packing segment,
FIG. 5 the buildup of the structured catalyst by stacking individual packing segments on top of one another.

The reformer tube 1 according to the invention depicted in FIG. 1 is divided into the sections A (reaction chamber), B (outlet chamber) and C (collection conduit).

Desulphurized natural gas together with reforming steam enter the reaction chamber A arranged in the upper part of the casing tube 3 via the inlet conduit 2. The casing tube consists of a nickel-chromium steel, for example of the G-X45NiCrNbTi3525 type. The entry temperature of the feed gas is 600° C., and the space velocity based on the catalyst volume is typically from 4000 to 5000 $m_{STP}^3/(m^3 h)$.

In the present example, the reformer tube is arranged upright with the open tube end of the casing tube 3 in the upper position and is heated from the outside by means of burners (not shown in FIG. 1). The open tube end of the casing tube is closed during operation of the reformer tube by a closure device 4, for example a flanged-on lid, which can be opened for inspection procedures and for introduction or removal of the catalyst.

After entering the casing tube, the natural gas and the reforming steam go into the structured catalyst 5 which is made up of individual packing segments and in respect of its structure corresponds to the structured catalyst described in US 2012/0195801 A1. It is provided with a nickel-containing active layer which is catalytically active for steam reforming. The structured catalyst also has such a structure that a significant proportion of the gas flow is deflected radially. As a result, part of the gas flow impinges on the interior wall of the reaction tube, which improves radial heat transfer. However, the effect is limited, so that a further improvement in the radial heat transfer, as is achieved by means of the reformer tube of the invention, is advantageous.

The feeds then flow upwards through the structured catalyst, with the endothermic steam reforming reaction taking place. After leaving the structured catalyst, the partially converted natural gas, which also contains still unreacted methane in addition to carbon oxides and hydrogen, enters a free space 8 which is arranged at the closed tube end 4 of the casing tube. The partially reacted feed gas stream subsequently goes into the inlet end of the straight heat exchanger tube 9 arranged within the catalyst bed. The gas stream flowing through the heat exchanger tube 9 releases part of its sensible heat in countercurrent to the catalyst bed and the feed gas stream flowing through it. The heat exchanger tube consists of materials having good resistance to metal dusting corrosion, e.g. Alloy 601, 602 CA, 617, 690, 692, 693, HR 160, HR 214, copper-containing alloys or multilayer materials in which the tubes are coated with tin-nickel or aluminium-nickel alloys. As an alternative or in addition, the outlet ends of the heat exchanger tubes are provided with a corrosion protection layer on their insides and on the sections passed through the separating plate also on the outsides. In the present example, this corrosion protection layer is an aluminium diffusion layer.

One possible variant of the example set forth above is to fill the free space 8 in the cold state largely with catalyst, for example a bed of a conventional reforming catalyst available as shaped bodies. In the hot state during operation of the reformer tube, a free space which performs the above-described deflection function for the gas flow is then again formed by longitudinal thermal expansion of the tube. It is advantageous here that contact of the gas stream containing synthesis gas products with metal surfaces and thus also the corrosion tendency are reduced.

After flowing through the heat exchanger tube, the synthesis gas product stream enters the outlet chamber B. For this purpose, the outlet end of the heat exchanger tube 9 is passed through the separating plate 6 and fixed in this way. It then opens, at the outlet end, into the inner tube 10 which represents the connection between the heat exchanger tubes 9 and the collection conduit 11. The inner tube is likewise made of one of the abovementioned metallic materials and its interior wall and preferably also its outer wall are provided with an aluminium diffusion layer as corrosion protection layer. As an alternative, it is also possible to use an inner tube made of a ceramic material.

The inner tube 10 is fixed in its position between the underside of the separating plate 6 and the collection conduit 11 by means of fasteners which are not depicted. There is therefore no fixed, gastight connection between inner tube and the underside of the separating plate, but instead the inner tube is at a distance from the latter or merely abuts the underside of the separating plate. In this way, equalization or transfer of the static pressure through the gas-permeable thermal insulation layer 12 to the interior wall of the casing tube 3 can occur. Contact of the interior wall of the casing tube with the static or only slowly flowing synthesis gas product is not critical, since the surface temperature thereof is below the temperature range relevant for metal dusting corrosion as a result of the insulation. Since the inner tube is thus not pressure-bearing, it can also be made of less pressure-resistant materials, for example ceramic materials.

A gas-permeable insulation material 12 is installed between the outer wall of the inner tube and the interior wall of the casing tube. Fibre-based insulation materials and also inherently dimensionally stable shaped ceramic bodies can be used for this purpose. The shaped ceramic bodies are particularly advantageous since they can be installed and removed particularly easily. Owing to their dimensional stability, they can easily be placed in the annular space between casing tube and inner tube during installation, without particular fastening means being required.

At the outlet end, too, the inner tube 10 is not connected in a fixed or gastight manner to the collection conduit 11, but instead is merely conducted or pushed into the latter. Apart from the above-described advantages, the inner tube can in this way be replaced particularly easily in the case of plant inspection. Furthermore, compressive or tensile stresses which can arise during operation of the reformer tube because of different coefficients of thermal expansion of the materials used for the casing tube and inner tube are avoided.

The collection conduit 11 is provided on its inside with insulation material 13 and/or a corrosion-resistant, for example ceramic, coating 14, which have increased resistance to metal dusting corrosion. The synthesis gas product stream is conducted out of the reformer tube 1 via the collection conduit and is fed to further work-up. This can, depending on the purpose for which the synthesis gas product is to be used, comprise carbon monoxide conversion, a gas scrub for separating off carbon dioxide, a pressure swing adsorption for separating off hydrogen and also further work-up steps.

Figure 2:
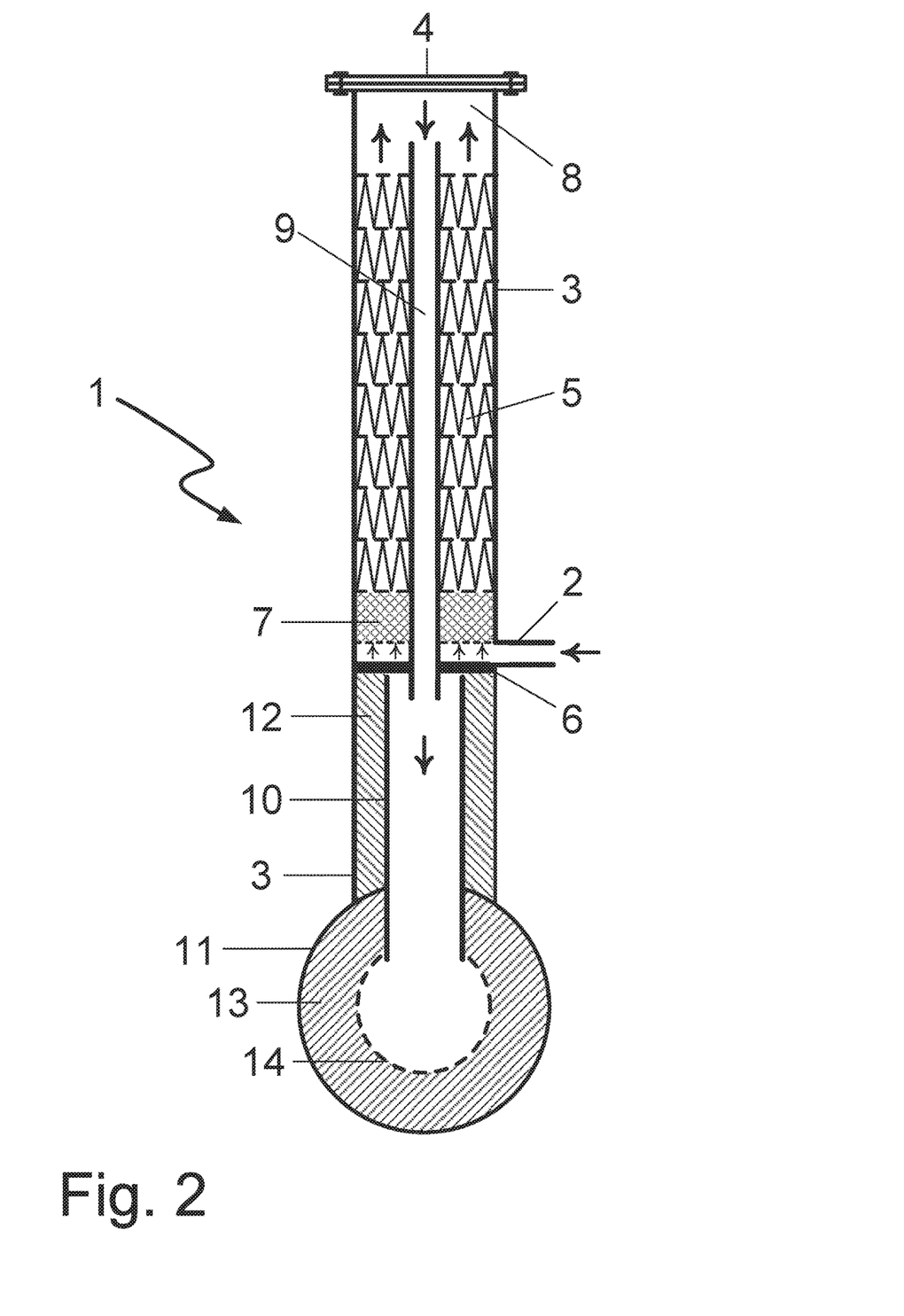

The second embodiment of the reformer tube of the invention, as depicted in FIG. 2, corresponds in terms of its structure and the features denoted by the reference numerals 1 to 6 and 9 to 14 to the embodiment shown in FIG. 1 and explained above. However, there is an additional catalyst bed 7 which is located upstream of the structured catalyst. This catalyst bed consists of a commercial reforming catalyst which is based on nickel and is present as shaped bodies. The free space in the reaction chamber for accommodating the catalyst bed is formed by leaving out the first packing segment in the flow direction. In addition, a mesh or perforated plate is provided as retention device on the underside of the catalyst bed. It is advantageous for the catalyst bed not to extend to the separating plate 6, but instead for a free space which serves to distribute the feed gas mixture over the cross section of the reformer tube to remain under it.

The use of the catalyst bed in a subregion of the reaction chamber of the reformer tube gives the abovementioned cost advantages. Furthermore, it is advantageous that the catalyst bed located upstream of the structured catalyst at the same time acts as mixing zone for the feed gas stream. Thus, a feed gas mixture which has been mixed better, especially in the radial direction, is supplied to the downstream structured catalyst. The support or bearer device of the first of the packing segments located downstream of the catalyst bed at the same time prevents fluidization of the catalyst bed.

Figure 3:
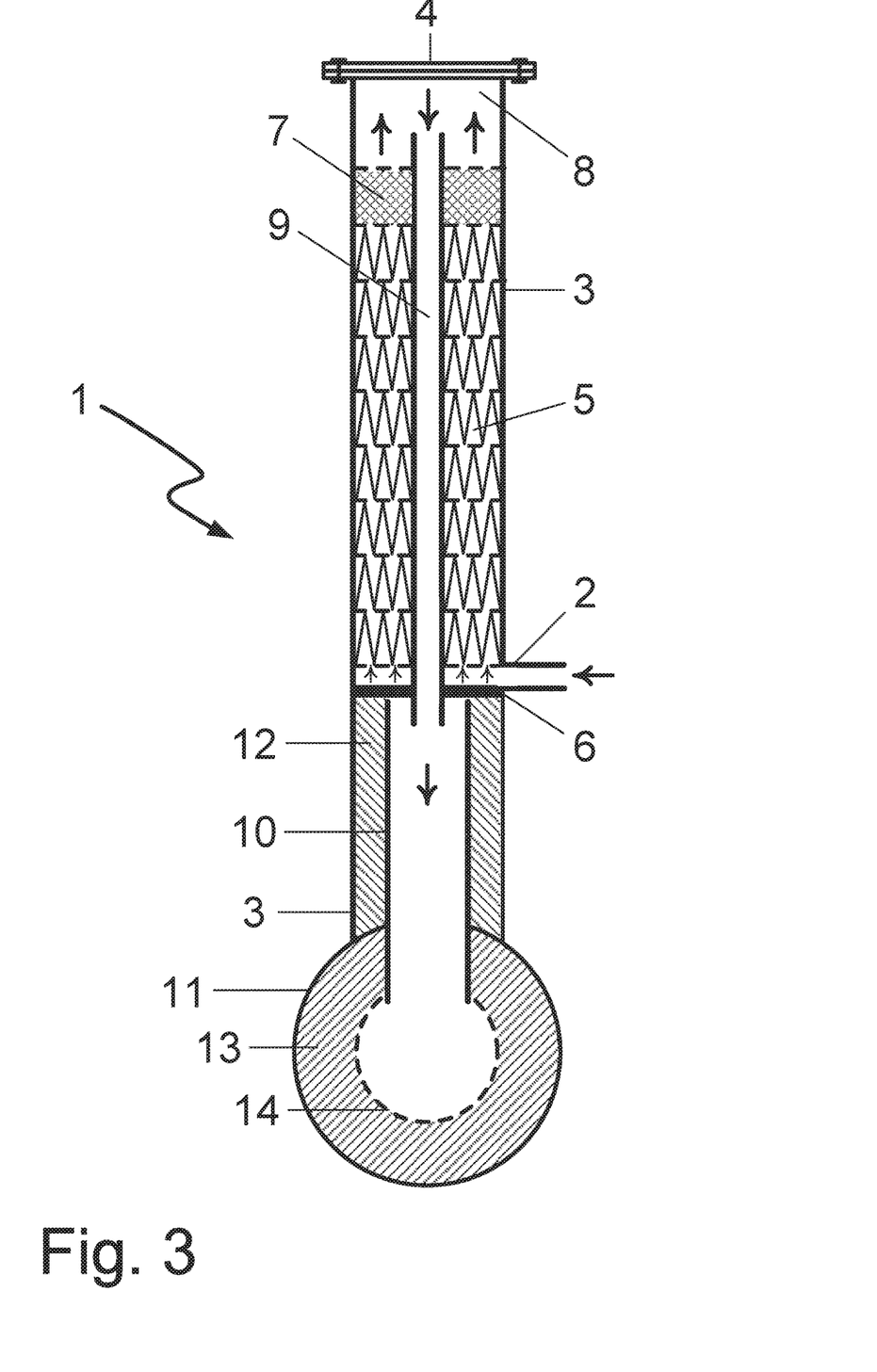

The third embodiment of the reformer tube of the invention as depicted in FIG. 3 corresponds in terms of its structure and the features denoted by the reference symbols 1 to 14 to the second embodiment which is shown in FIG. 2 and has been explained above. However, the catalyst bed 7 is now located downstream of the structured catalyst, which increases the total conversion of the feed gas mixture into synthesis gas products. A catalyst type which is active at lower temperatures and is based on nickel and/or contains noble metals is preferably used as catalyst here. The risk of undesirable fluidization of the bed catalyst is lower in the case of this arrangement than in the embodiment shown in FIG. 2 since the feed gas stream has already lost part of its kinetic energy as a result of the pressure drop over the structured catalyst. However, in the interests of safety, a retention device can, if the pressure drop conditions allow, still be located downstream of the catalyst bed 7 at the outlet end, as is indicated by the broken line in FIG. 3.

In the case of all embodiments in which sections containing catalyst beds are also present in addition to structured catalyst, it has to be ensured that there is no empty space between structured and unstructured catalyst regions in the hot state during operation of the reformer tube, since the reforming reactions do not occur in the empty space because of the lack of catalyst and superheating could occur due to the lack of heat consumption.

Figure 4:
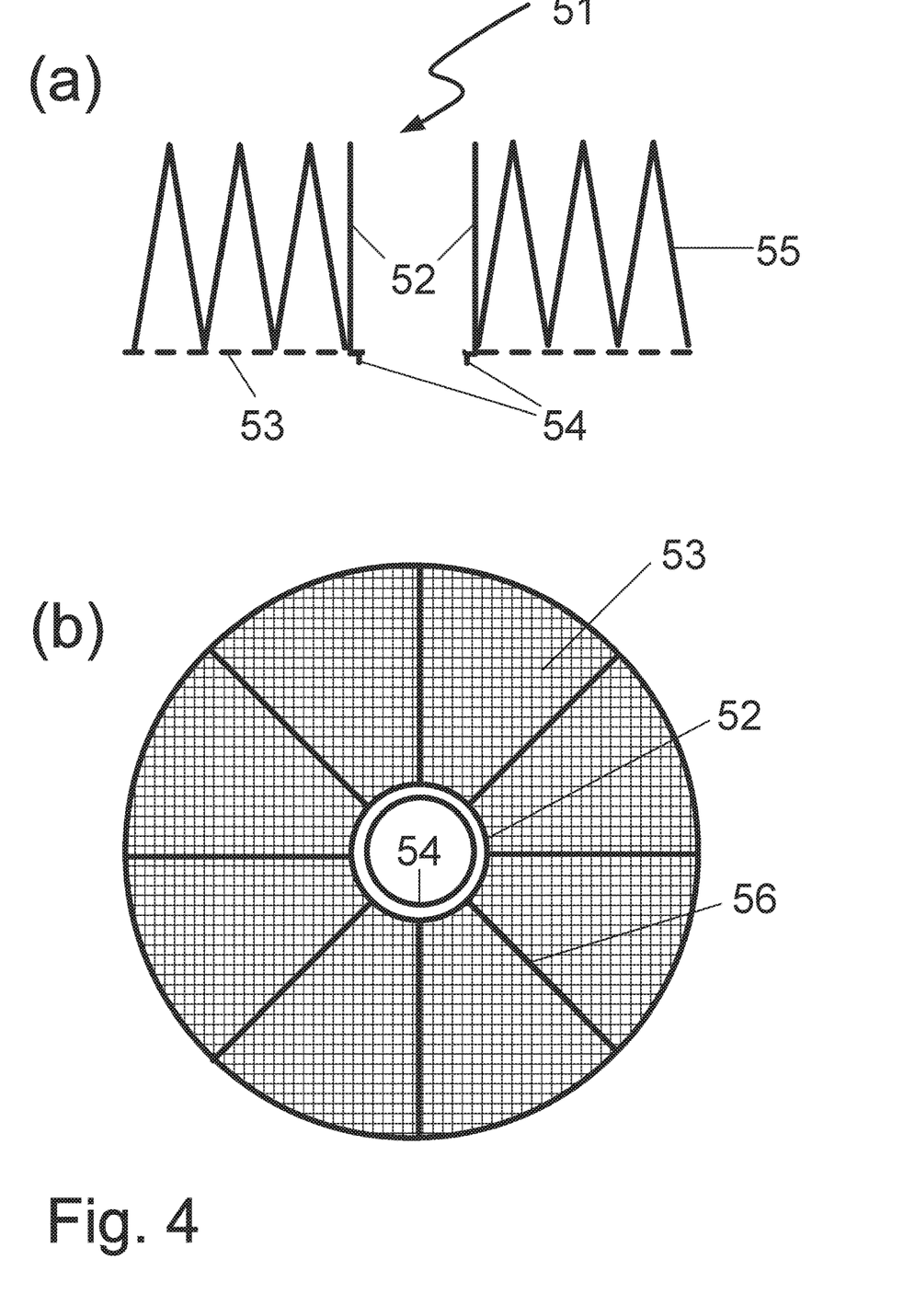

In FIG. 4 (a), the structure of a packing segment 51 is shown schematically as side view as possibility for an embodiment of the invention. In the example shown, the heat exchanger tube 9 is also made up of individual tube segments 52. The support and bearer device 53 is fastened, for example by means of a welded join, to the tube segment 52. As support and bearer device, it is possible to use, for example, a perforated plate. In the direction of the centre of the packing segment, the support and bearer device ends in a collar 54 which serves as fastening element for the adjoining packing segment underneath. The packing material 55 rests on the support and bearer device and surrounds the tube segment 52 in an annular fashion.

The heat exchanger tube segments can additionally fulfil functions in the assembly of the reformer tube of the invention. Thus, the packing material 55 can firstly be placed and centred on the tube segment 52 and then fixed to the latter. The packing segment 51 is subsequently inserted into the casing tube 3 and the packing material 55 expands radially against the interior wall of the casing tube so that a substantially gastight closure is created and short circuit flows axially along the interior wall of the casing tube and thus past the structured packing are minimized.

FIG. 4 (b) shows the packing segment 51 depicted in FIG. 4 (a) in plan view, with the packing material 55 having been left out. It is now possible to see the struts 56 which are arranged under the support plate 53 and support the latter from below. They are fastened to the tube segment 52. If the support plate and the struts are made of a metal or another material having good thermal conductivity, the radial heat transfer in the reformer tube is additionally assisted.

Figure 5:
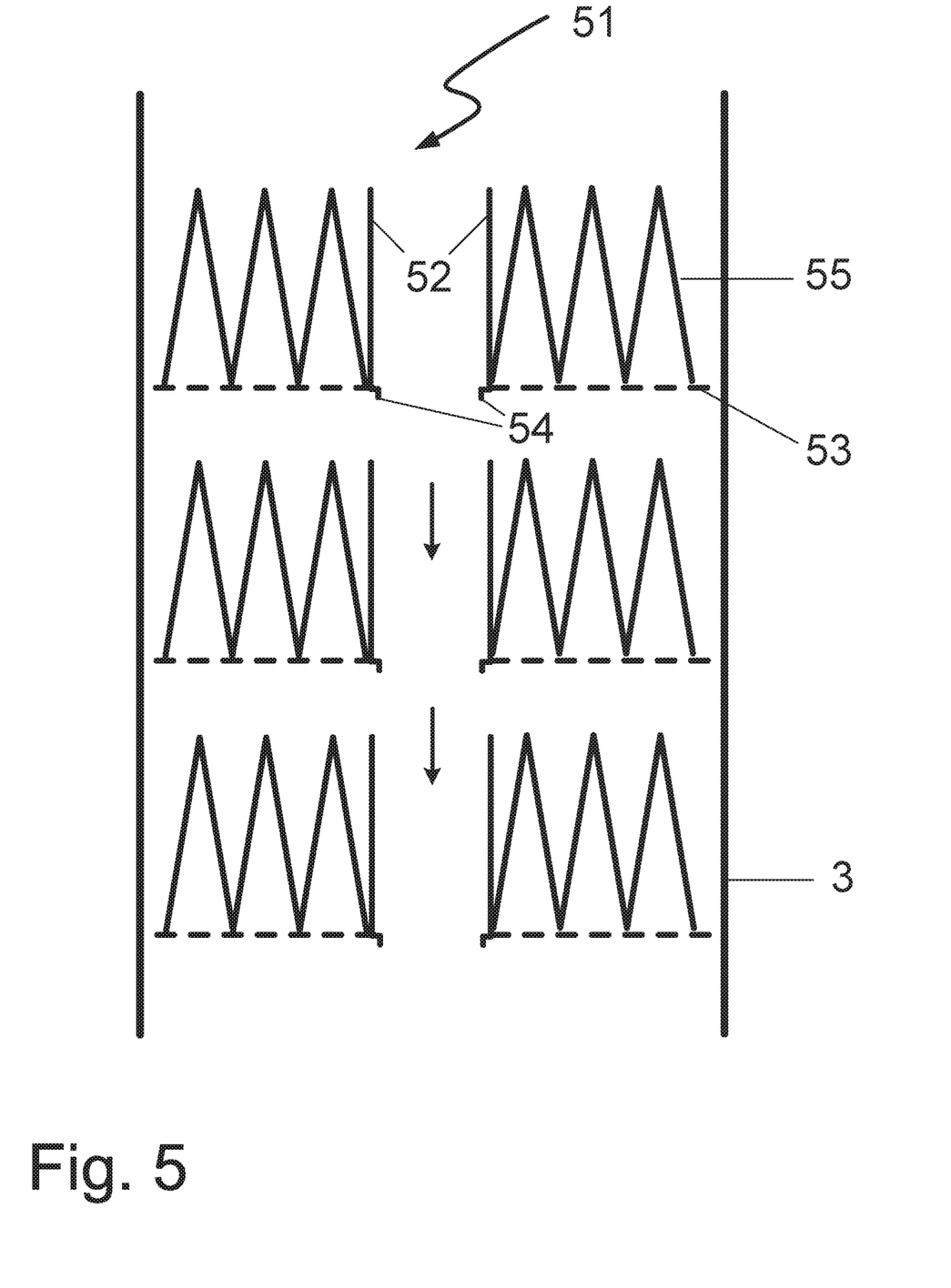

FIG. 5 shows the buildup of the structured catalyst by stacking individual packing segments 51 on top of one another in the casing tube 3. The collars 54 in each case engage in the heat exchanger tube segment 52 underneath and fix it in this way. An additional support plate 53 which finishes off the arrangement at the top and a pipe section which finishes off the arrangement at the bottom and serves for fixing the lowermost packing segment and holds the entire arrangement against the separating plate 6 are not shown (cf. FIGS. 1 to 3).

In constructing the structured catalyst, it has to be ensured that the structure is able to move in the axial direction within the casing tube in order to avoid mechanical stresses due to the longitudinal thermal expansion of the reformer tube during operation thereof. On the other hand, the individual heat exchanger tube segments 52 have to be pressure-tight after assembly; here, the pressure-tightness relates to the pressure drop which the feed gas stream suffers during passage through the reformer tube. This has to be ensured by appropriate structural measures by means of which, for example, an appropriate contact pressure is exerted in the vertical direction on the heat exchanger tube made up of segments.

INDUSTRIAL APPLICABILITY

The invention proposes a reformer tube which has advantageous properties in respect of the pressure drop combined with intensive contact between catalyst surface and feed gases and in which at the same time the internal heat exchange, in particular in the radial direction, is improved compared to the reformer tubes known from the prior art. Both properties reduce the energy consumption necessary for operating a reformer plant and thus improve the economics of the process.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE SYMBOLS

[1] reformer tube
[2] inlet conduit
[3] casing tube
[4] closure device
[5] structured catalyst
[6] separating plate
[7] catalyst bed
[8] free space
[9] heat exchanger tube
[10] inner tube
[11] collection conduit
[12] insulation layer
[13] insulation layer
[14] coating
[51] packing segment
[52] heat exchanger tube segment
[53] support plate
[54] collar
[55] packing segment
[56] strut
[A] reaction chamber
[B] outlet chamber
[C] collection conduit

The invention claimed is:

1. A reformer tube for converting a hydrocarbon-containing feed into a synthesis gas product containing carbon oxides and hydrogen under steam reforming conditions, the reformer tube comprising:
   (a) a reaction chamber comprising an outer, pressure-bearing casing tube, which is configured to receive heat from the outside, wherein the casing tube is demarcated at a first end from an adjacent outlet chamber by means of a separating plate and is closed at a second end by means of a closure device;
   (b) at least one structured packing disposed in the reaction chamber and containing a catalyst which is active for steam reforming;
   (c) an inlet for a feed gas stream comprising the hydrocarbon-containing feed arranged on the reaction chamber, where the inlet is disposed at an end of the reaction chamber closest to the separating plate and is in fluid communication with a gas inlet into the structured packing;
   (d) a heat exchanger tube disposed within the reaction chamber and within the structured packing and having a heat exchanger inlet end that is in fluid communication with a gas outlet from the structured packing, wherein the heat exchanger tube further comprises a heat exchanger outlet end that is in fluid communication with the outlet chamber, where the feed gas stream flows, after entry into the reaction chamber, firstly through the structured packing and subsequently countercurrently through the heat exchanger tube, wherein the heat exchanger tube and the synthesis gas product stream flowing through the heat exchanger tube are in a heat exchange relationship with the structured packing and the feed gas stream flowing through the structured packing;
   (e) a collection conduit for the synthesis gas product which is in fluid communication with the outlet chamber, where
   (f) the outlet end of the heat exchanger tube passes through the separating plate, opens into the outlet chamber and is in fluid communication with the collection conduit so that the synthesis gas product can go from the reaction chamber via the outlet chamber into the collection conduit, wherein
   (g) the outlet chamber comprises an inner tube having an upper end and a lower end, wherein the upper end is proximate the separating plate, and the lower end is proximate the collection conduit, and wherein
   (h) there is an absence of a gas tight connection between the inner tube and the separating plate, such that either the inner tube abuts the separating plate or the inner tube is at a distance from the separating plate.

2. The reformer tube according to claim 1, wherein the casing tube and the heat exchanger tube have a circular cross section and the structured packing has an annular cross section and the casing tube, the structured packing and the heat exchanger tube are arranged coaxially and concentrically, with the structured packing being arranged between the inner wall of the casing tube and the outer wall of the heat exchanger tube so as to form an essentially gastight closure.

3. The reformer tube according to claim 1, wherein the reformer tube is arranged upright, with the reaction chamber being arranged in the upper region and the outlet chamber being arranged in the lower region and the feed gas stream flowing from the bottom upwards through the structured packing.

4. The reformer tube according to claim 1, wherein both the structured packing and the heat exchanger tube consist of individual modules or segments, with each heat exchanger tube segment being equipped with a support or bearer device for the associated packing segment.

5. The reformer tube according to claim 1, wherein the reaction chamber comprises at least one region which contains a bed of a particulate, solid catalyst which is active for steam reforming.

6. The reformer tube according to claim 5, wherein the region containing the catalyst bed is formed by a corresponding packing segment being left out but the associated heat exchanger tube segment being present.

7. The reformer tube according to claim 1, wherein the heat exchanger tube is at least partly filled with a bed of inert bodies or is provided on its inside with guide plates.

8. A reformer furnace comprising a lid, a bottom, walls clad or lined with refractory material, and an interior space formed thereby, wherein the reformer furnace further comprises at least one reformer tube as claimed in claim 1, and at least one burner configured to heat the reformer tube, wherein the at least one reformer tube and the at least one burner are disposed in the interior space or in a secondary space that is in fluid communication with the interior space.

9. The reformer furnace according to claim 8, wherein the at least one reformer tube is arranged upright in the interior space, where the part of the reformer tube encompassing the reaction chamber is arranged at least partly in the interior space and the part of the reformer tube encompassing the outlet chamber is arranged at least partly outside the interior space.

10. The reformer furnace according to claim 9, wherein the inlet for the feed gas stream comprising the feed is also arranged outside the interior space.

11. The reformer furnace according to claim 8, wherein a plurality of reformer tubes and burners are arranged in the interior space and in that the longitudinal axes of flames produced by the burners are directed parallel to the longitudinal axes of the reformer tubes.

12. The reformer tube according to claim 1, wherein the inner tube is fixed in position between an underside of the separating plate and the collection conduit by means of fasteners.

13. The reformer tube according to claim 1, further comprising thermal insulation surrounding the inner tube.

14. A process for producing synthesis gas by catalytic steam reforming of hydrocarbon-containing feed under steam reforming conditions in the presence of a solid catalyst which is active for steam reforming, the process comprising the following steps:
  (a) catalytically converting the hydrocarbon-containing feed in the presence of steam under steam reforming conditions into a synthesis gas product containing carbon oxides and hydrogen; and
  (b) discharging the synthesis gas product,
  wherein the catalytic conversion in step (a) is carried out in a reformer tube according to claim 1.

\* \* \* \* \*